United States Patent
Ohba

(10) Patent No.: US 6,305,748 B1
(45) Date of Patent: Oct. 23, 2001

(54) SEAT RECLINER

(75) Inventor: Tsunehito Ohba, Shizuoka (JP)

(73) Assignee: Fuji Kiko Co., Ltd., Kosai (JP)

( * ) Notice: Subject to any disclaimer, the term of this patent is extended or adjusted under 35 U.S.C. 154(b) by 0 days.

(21) Appl. No.: 09/466,855

(22) Filed: Dec. 20, 1999

(30) Foreign Application Priority Data

Dec. 21, 1998 (JP) .................................................. 10-362841

(51) Int. Cl.$^7$ ....................................................... B60N 2/02
(52) U.S. Cl. ............................................................. 297/362
(58) Field of Search ............................... 297/362, 354.12, 297/361.1; 475/175, 162; 74/411.5

(56) References Cited

U.S. PATENT DOCUMENTS

| | | | |
|---|---|---|---|
| 4,371,207 | * 2/1983 | Wilking et al. . | |
| 5,154,475 | * 10/1992 | Kafitz . | |
| 5,308,294 | 5/1994 | Witting et al. | ......................... 475/162 |
| 5,312,158 | 5/1994 | Witting et al. | ......................... 297/362 |
| 5,586,833 | * 12/1996 | Vossmann et al. . | |
| 5,634,380 | * 6/1997 | Scholz et al. . | |
| 5,871,414 | 2/1999 | Voss et al. | ........................... 475/175 |

FOREIGN PATENT DOCUMENTS

| | | |
|---|---|---|
| 3-237904 | 10/1991 | (JP) . |
| 4-269912 | 9/1992 | (JP) . |

* cited by examiner

Primary Examiner—Milton Nelson, Jr.
(74) Attorney, Agent, or Firm—Foley & Lardner

(57) ABSTRACT

A seat recliner includes a base, a bushing fixed to the base, and a rotatable camshaft one end of which is supported by the bushing. The other end of the camshaft is supported by a fixed bracket that is formed with internal teeth and secured to the base. A moveable bracket having external teeth is pivotally disposed on the camshaft between the base and the fixed bracket. The camshaft connects, in eccentric relation, the fixed bracket and the moveable bracket. Two wedges and a spring biasing the wedges in opposed circumferential directions of the camshaft cooperate to reduce a clearance between the internal teeth and the external teeth when the internal teeth and the external teeth are in the intermeshing position. A support is disposed on the bushing and holds the wedges in a proper position on the camshaft.

10 Claims, 5 Drawing Sheets

SEAT RECLINER

BACKGROUND OF THE INVENTION

FIELD OF THE INVENTION

The present invention relates to seat recliners for a vehicle, and more specifically to seat recliners using a so-called taumel gearing that employs intermeshing spur and ring gear elements.

One example of such recliners includes two relatively moveable brackets connected with a seat cushion and a seat back, respectively. The brackets are connected with each other in an eccentric relation through a shaft. The shaft is supported at its one end by a base or cover member that is fixed to one of the brackets. The brackets have intermeshable internal and external teeth, respectively. A pair of wedges are disposed on the shaft in a circumferentially spaced relation to each other. A spring biases the wedges so as to be apart from each other and moved toward a radial projection that is disposed on the shaft. The wedges and the spring cooperate to eliminate a radial play or clearance between the internal and external teeth of the brackets at the intermeshing position to thus surely retain one of the brackets at a desired position relative to the other bracket.

In such conventional recliners, it is likely that the wedges are undesirably displaced from the axial position on the shaft upon rotation of the shaft. This is because an axial space for accommodating the spring is produced between the wedges and the base member becomes too large so that there is no support for the wedges in an axial direction of the shaft.

In order to restrict the undesired displacement of the wedges, there has been proposed an arrangement in which the spring includes a portion extending along an axial end face of each wedge. This arrangement, however, will perform insufficient retention of the wedges in the axial position because of the spring being made of a wire material. Further, since a non-uniform axial space between the wedges and the base member tends to be produced, it will occur that the spring remains pressed against the wedges and locked up thereon in a case where the axial space is partly smaller than a diameter of the spring. This will cause influence on the movement of the wedges upon rotation of the shaft, leading to insufficient performance of the wedges in elimination of the play between the intermeshing teeth of the brackets.

Otherwise, it will be proposed that a retainer for the wedges is provided as a separate part. In such a case, the total number of parts of the seat recliner will be increased and then the manufacturing cost will be raised.

An object of the present invention is to provide an improved seat recliner for a vehicle which has a simple structure and is capable of holding the wedges in a proper position where the wedges can surely operate during rotation of the shaft in operation of the seat recliner.

SUMMARY OF THE INVENTION

According to one aspect of the present invention, there is provided a seat recliner comprising:

a base;

a first bracket fixed to said base, said first bracket defining internal teeth;

a camshaft rotatably supported by said base and said first bracket, said camshaft having a first axis and a radially projecting cam portion;

a second bracket moveable relative to said first bracket, said second bracket being disposed between said base and said first bracket, said second bracket defining external teeth meshable with the internal teeth and an opening receiving said cam portion;

a positioning member cooperating with said cam portion to define a rotatable body fitted to the opening of said second bracket and bring a center axis of the rotatable body into a position eccentric to said first axis, said rotatable body causing displacement of intermeshing between the external teeth and the internal teeth upon rotation of said camshaft;

two wedges disposed on said cam portion within the opening of said second bracket, said two wedges being adjacent to said positioning member in an axial direction of said camshaft and spaced from each other in a circumferential direction of said camshaft;

a spring biasing said two wedges in opposed circumferential directions of said camshaft, said spring cooperating with said wedges to reduce a clearance between the external teeth and the internal teeth upon intermeshing;

a bushing fixed to said base, said bushing supporting said camshaft; and a support holding said two wedges in a proper position relative to said cam portion of said camshaft, said support being disposed on said bushing and extending in a direction of said axis.

DESCRIPTION OF THE PREFERRED EMBODIMENT

Figure 1:
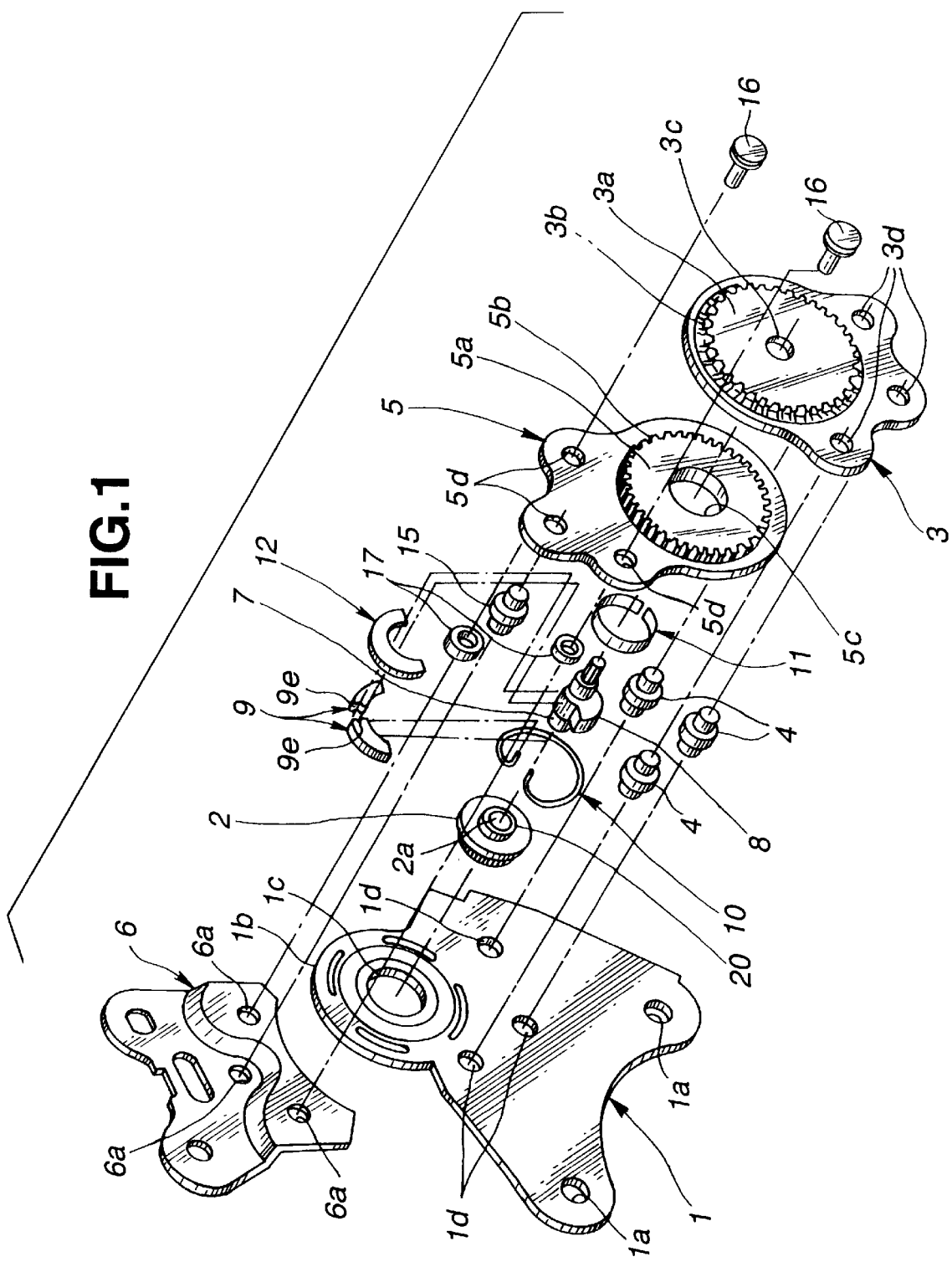
FIG. 1. is an exploded perspective view of a seat recliner according to the present invention.
Figure 2:
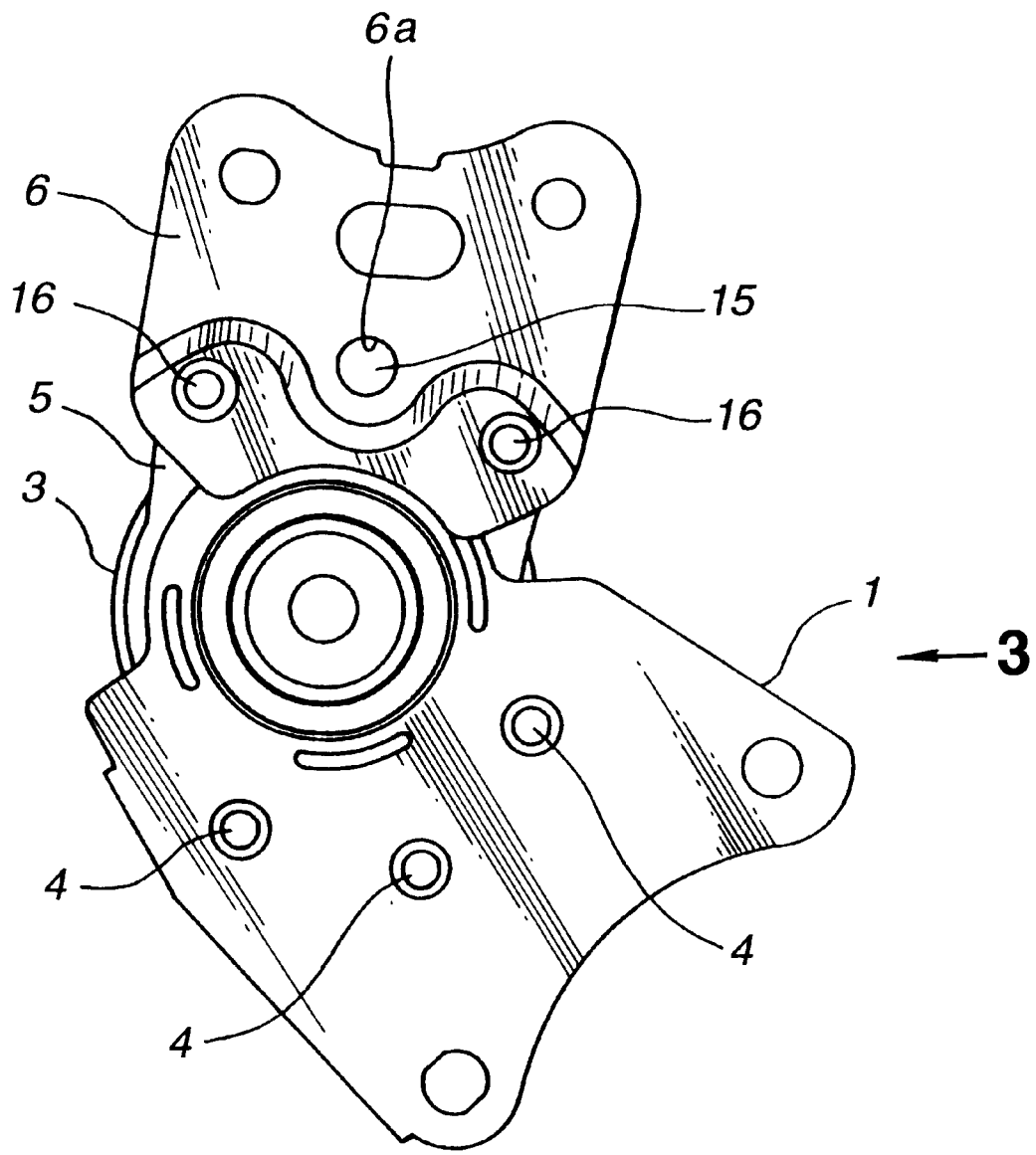
FIG. 2 is an elevation of the seat recliner, as viewed from a direction indicated by the arrow 2 in FIG. 3.
Figure 3:
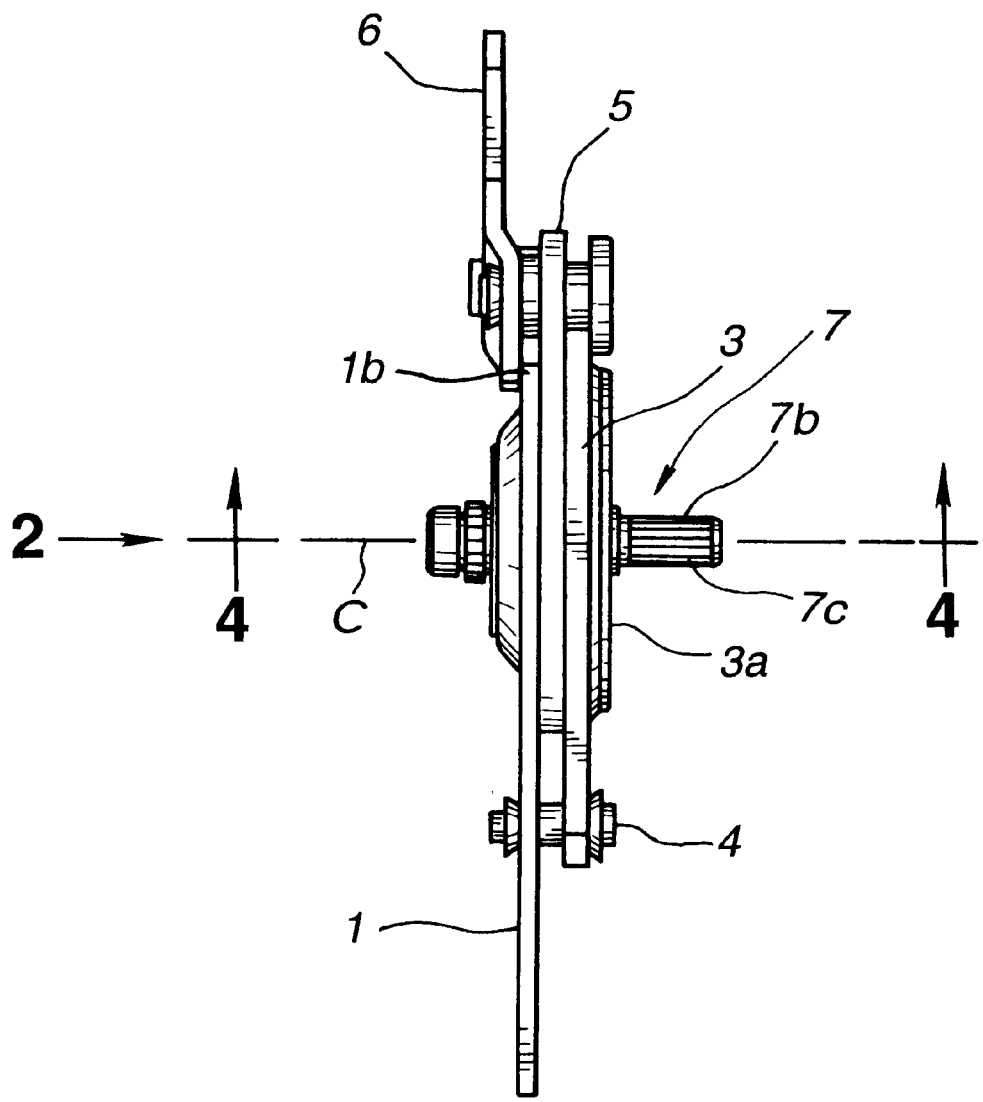
FIG. 3 is a side view of the seat recliner, as viewed from a direction indicated by the arrow 3 in FIG. 2.

Referring now to FIGS. 1 to 4, there is shown a seat recliner for a vehicle, according to a preferred embodiment of the present invention.

As illustrated in FIGS. 1–4, the seat recliner includes a plate-like base 1. The base 1 is fixedly connectable with a seat cushion, not shown, by means of bolts, not shown, inserted through bolt insertion holes 1a, 1a. The base 1 includes a generally rectangular wall portion formed with the holes 1a, 1a and an arcuate wall portion 1b connected with the rectangular wall portion. The arcuate wall portion 1b has a circular opening 1c and an arcuate circumferential edge spaced from a center of the opening 1c at a predetermined radial distance.

A bushing 2 is fixed to the base 1 by being press-fitted to the opening 1c of the base 1. The bushing 2 has a center bore 2a receiving one end of a camshaft 7 explained in detail later, and supports the camshaft 7 thereon.

A fixed bracket 3 is secured to the base 1 by using fastening pins 4. The fixed bracket 3 includes a gear portion 3a having internal teeth 3b. The gear portion 3a is formed by embossing so as to project in such a direction as to be away from the arcuate wall portion 1b of the base 1. The gear portion 3a includes a circular wall portion defining a center opening 3c concentric to the center bore 2a of the bushing 2. The internal teeth 3b of the gear portion 3a are formed on an inner circumferential periphery surrounding the circular wall portion. The fastening pins 4, three pins in this embodiment, are inserted into rivet holes 1d of the base 1 and rivet holes 3d of the fixed bracket 3 and caulked at their distal ends. The rivet holes 1d are formed in the rectangular wall portion of the base 1. The rivet holes 3d are formed in a lower flange of the fixed bracket 3. The rivet holes 1d and 3d are aligned with one another and arranged in equidistantly spaced relation.

A moveable bracket 5 is disposed between the base 1 and the fixed bracket 3 and moveable relative to the base 1 and the fixed bracket 3. The moveable bracket 5 includes a gear portion 5a having external teeth 5b. The gear portion 5a may be formed similar to the gear portion 3a of the fixed bracket 3. The gear portion 5a is received in the gear portion 3a of the fixed bracket 3. The gear portion 5a includes a circular wall portion defining a center opening 5c greater in diameter than the center opening 3a of the gear portion 3a of the fixed bracket 3. The circular wall portion also defines the external teeth 5b meshable with the internal teeth 3b of the fixed bracket 3, on an outer circumferential periphery thereof. The number of the external teeth 5b is smaller by one than the number of the internal teeth 3b of the fixed bracket 3. The moveable bracket 5 is secured to a seat back, not shown, through an arm 6. The arm 6 is fixed to the moveable bracket 5 with a predetermined space therebetween by means of a pin 15 and two rivets 16. The moveable bracket 5 has three rivet holes 5d in an upper flange connected with the gear portion 5a. The arm 6 has three rivet holes 6a in a lower portion thereof. The pin 15 is inserted into the central rivet holes 5d and 6a each disposed in the middle of the three rivet holes 5d and 6a of the moveable bracket 5 and the arm 6. The rivets 16 are inserted into the remaining rivet holes 5d and 6a through collars 17 and caulked at their distal ends. The lower portion of the arm 6 cooperates with the upper flange of the moveable bracket 5 to sandwich the arcuate wall portion 1b of the base 1 therebetween as shown in FIG. 4.

Figure 4:
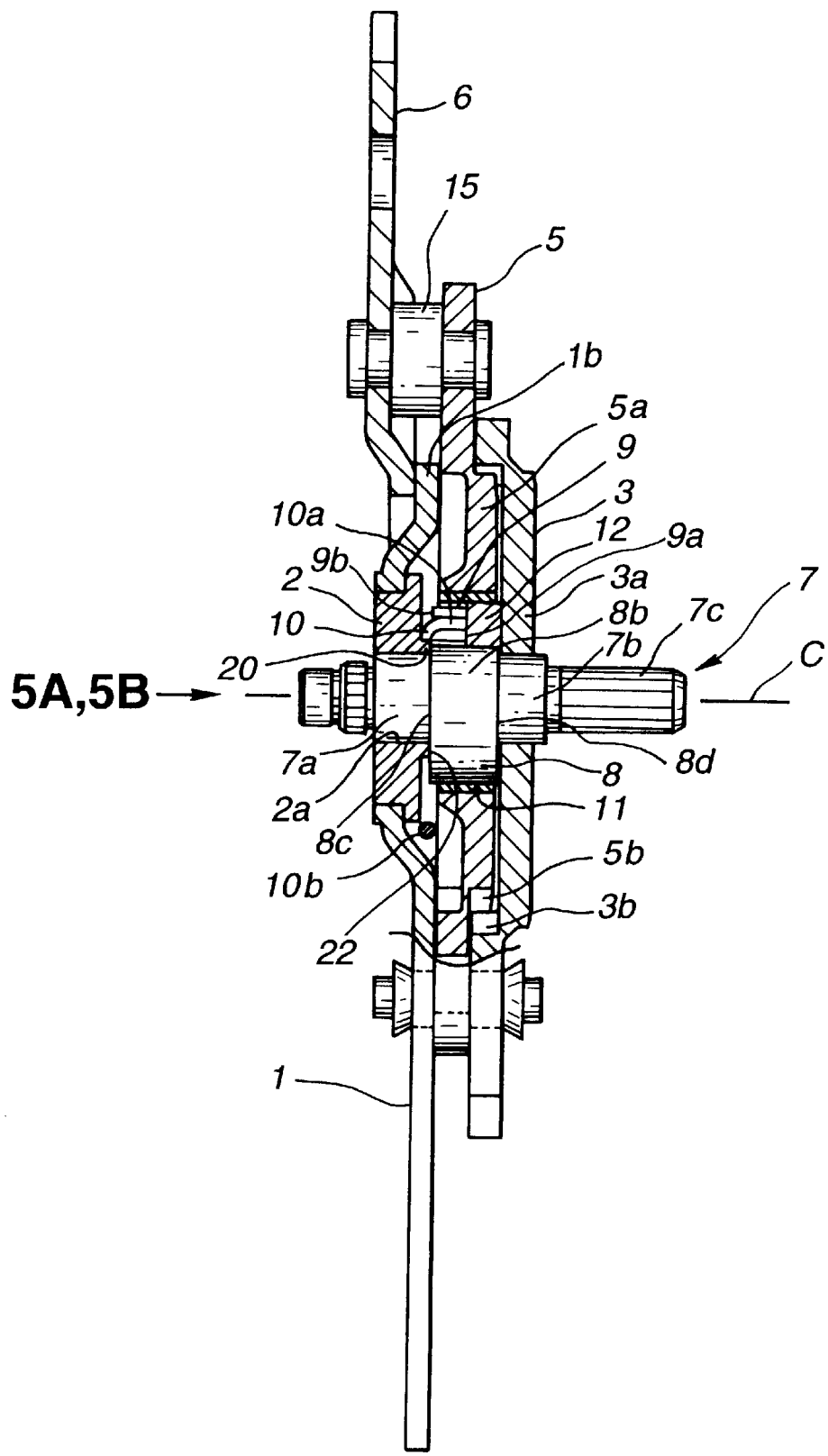
FIG. 4 is an enlarged partial cross-section of the seat recliner, taken along the line 4—4 in FIG. 3.

As best shown in FIG. 4, the camshaft 7 has an axis C and is supported to be rotatable about the axis C by the base 1 through the bushing 2 and the fixed bracket 3. The camshaft 7 has one end portion 7a received in the center bore 2a of the bushing 2 and an opposite end portion 7b projecting from the center opening 3c of the fixed bracket 3. The one end portion 7a is treated by quenching and the opposite end portion 7b is formed with a serrated portion 7c having a reduced diameter. The opposite end portion 7b is connected through the serrated portion 7c with a manually-operated actuator such as knob or an electrically-operated actuator, not shown. The camshaft 7 has a radially projecting cam portion 8 disposed between the opposed end portions 7a and 7b. The cam portion 8 is disposed within the center opening 5c of the moveable bracket 5. The cam portion 8 has a greater diameter than a diameter of each of the opposed end portions 7a and 7b. In this embodiment, the cam portion 8 is formed integrally with the camshaft 7. The cam portion 8 has a cam lobe circumferentially extending at a predetermined angle around the axis C to form a sectorial shape shown in FIG. 5A. The cam portion 8 includes a circumferential cam surface 8b extending circumferentially and parallel to the axis C and radially extending cam surfaces 8a, 8a radially outwardly extending from the circumferential cam surface 8b and circumferentially spaced from each other. The radially extending cam surfaces 8a, 8a are located on opposite side faces of the sectorial cam lobe. The cam portion 8 also includes axial end faces 8c and 8d axially spaced from each other and extending in a direction perpendicular to the axis C. The axial end faces 8c and 8d are opposed to the bushing 2 and the circular wall portion of the gear portion 3a of the fixed bracket 3, respectively.

A positioning member 12 is disposed on the cam portion 8 and inside a bearing 11 fitted to the center opening 5c of the moveable bracket 5. The bearing 11 made of a plate material is formed into an annular shape and press-fitted to the center opening 5c. The positioning member 12 cooperates with the cam portion 8 to define a generally disk-shaped rotatable body fitted to the center opening 5c through the bearing 11 and bring a center axis as indicated at C1 in FIG. 5A, of the rotatable body into a position eccentric to the axis C of the camshaft 7. The center axis C1 of the rotatable body is substantially aligned with a center of the center opening 5c of the moveable bracket 5. As the rotatable body rotates upon rotation of the camshaft 7, an intermeshing between the internal teeth 3b of the fixed bracket 3 and the external teeth 5b of the moveable bracket 5 is displaced. Specifically, the positioning member 12 has a generally C-shape as viewed in a direction perpendicular to the axis C. The positioning member 12 is located on the circumferential cam surface 8b of the cam portion 8 and moves thereon upon rotation of the camshaft 7. The positioning member 12 has side faces spaced from each other in a circumferential direction of the camshaft 7, one of which is urged by the cam surface 8a of the cam portion 8 upon rotation of the camshaft 7. The positioning member 12 has end faces spaced from each other in the direction of the axis C, one of which is opposed to an inner surface of the circular wall portion of the gear portion 3a of the fixed bracket 3. The other end face of the positioning member 12 is opposed to a pair of wedges 9, 9.

Figure 5:
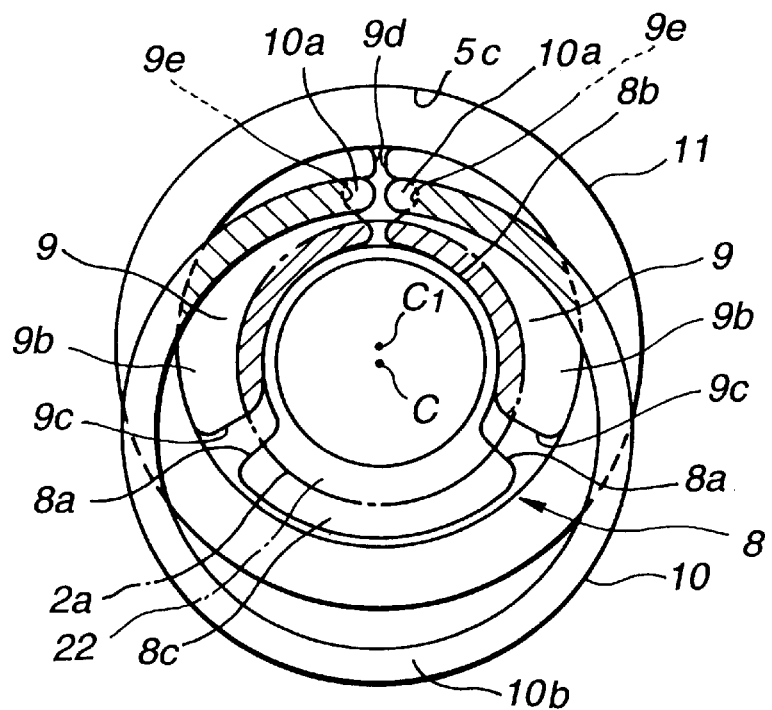
FIGS. 5A and 5B are enlarged partial views each showing a relative position between two wedges, a spring and a camshaft in the seat recliner, as viewed from a direction indicated by the arrows 5A and 5B in FIG. 4.
Figure 5:
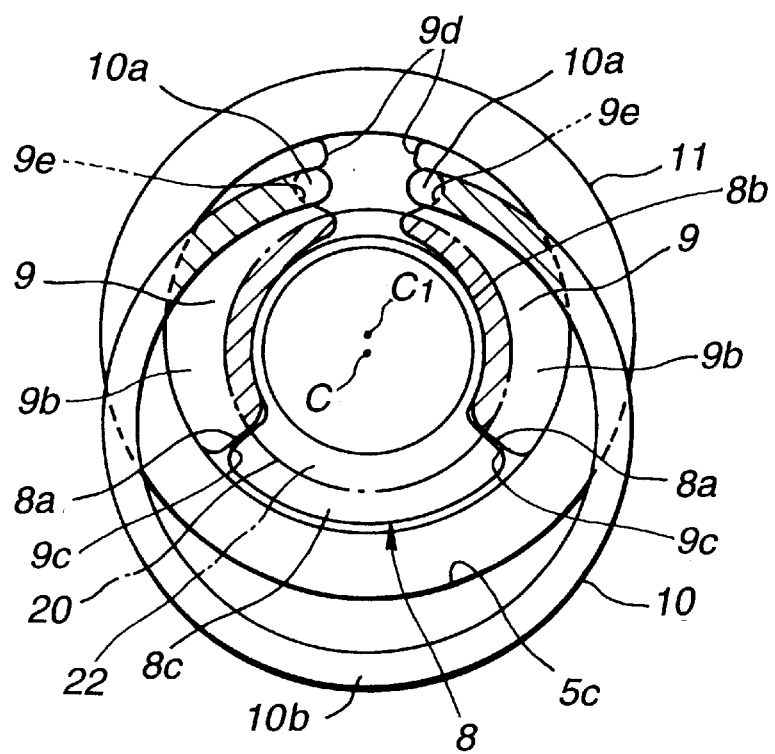

The wedges 9, 9 are disposed on the circumferential cam surface 8b of the cam portion 8 of the camshaft 7 inside the bearing 11 within the center opening 5c of the moveable bracket 5. The wedges 9, 9 are disposed adjacent to the positioning member 12 in the axial direction of the camshaft 7 and in contact therewith, as shown in FIG. 4. Each of the wedges 9, 9 has opposed end faces 9a and 9b extending in a direction substantially perpendicular to the axis C of the camshaft 7 and spaced from each other in the direction of the axis C. The end face 9a mates with the end face of the positioning member 12. As illustrated in FIG. 5A, the wedges 9, 9 are arranged on the circumferential cam surface 8b in a spaced relation to each other in a circumferential direction of the camshaft 7 and located on opposite sides of the cam lobe of the cam portion 8. Each of the wedges 9, 9 has a generally sectorial shape and includes opposed side faces 9c and 9d circumferentially spaced from each other. The side faces 9c is smaller in area than the opposite side face 9d. The side face 9c is urged by the cam surface 8a of the cam portion 8 to move on the circumferential cam surface 8b upon rotation of the camshaft 7. The opposite side face 9d has a groove 9e engaged with a spring 10.

A spring 10 biases the two wedges 9, 9 in opposed circumferential directions of the camshaft 7, namely, in such a direction as to move the wedges 9, 9 away from each other. The spring 10 cooperates with the wedges 9, 9 to reduce a clearance or play between the internal teeth 3b of the fixed bracket 3 and the external teeth 5b of the moveable bracket 5 when the internal teeth 3b and the external teeth 5b are in the intermeshing position thereof. Specifically, the spring 10 includes a generally annular body portion 10b circumferentially extending around the camshaft 7 and opposed hook portions 10a that are connected with the annular body portion 10b and extend substantially parallel to the axis C toward the end face of the positioning member 12. Each of the opposed hook portions 10a is engaged with the groove 9e of the side face 9d of each wedge 9 and retained thereby. The annular body portion 10b is disposed within a predetermined space between the bushing 2 and the moveable bracket 5. The predetermined space is set in such a way that the annular body portion 10b of the spring 10 can be prevented from being pressed against the bushing 2. The annular body portion 10b includes a portion that is contacted with substantially an outer circumferential portion of the end face 9b of each wedge 9 as indicated by hatching in FIG. 5A. The portion of the annular body portion 10b is located near the respective hook portions 10a.

The predetermined space is defined by a support 20 that is disposed on the bushing 2 and extends in the direction of the axis C of the camshaft 7. The support 20 holds the two wedges 9, 9 in a proper position relative to the cam portion 8 of the camshaft 7. The support 20 includes a support surface 22 extending in a direction perpendicular to the axis C of the camshaft 7. The support surface 22 is in contact with the end face 9b of each wedge 9 and the axial end face 8c of the cam portion 8 of the camshaft 7. In this embodiment, the support 20 is a cylindrical integral flange formed integrally with the bushing 2 and the support surface 22 is located on an annular axial end face of the flange. The support 20 has an outer diameter greater than a diameter of the cam portion 8 and an inner diameter smaller than the diameter of the cam portion 8. The support surface 22 is in contact with an inner circumferential portion of the end face 9b of the wedge 9 as indicated by hatching in FIG. 5A, and a portion of the axial end face 8c of the cam portion 8. The remaining portion of the axial end face 8c that is out of contact with the support surface 22 is located on the cam lobe. The arrangement of the support 20 ensures that the two wedges 9, 9 are always held in the proper position on the cam surface 8b of the cam portion 8 during rotation of the camshaft 7.

FIG. 5B shows a relative position between the wedges 9, 9, the spring 10 and the cam portion 8 of the camshaft 7, which differs from the relative position shown in FIG. 5A. As illustrated in FIG. 5B, the wedges 9, 9 are located close to the cam surface 8a of the cam lobe because there is large difference in the radius of curvature between the cam surface 8b and an inner circumferential surface of each wedge 9 that is contacted with the cam surface 8b, as compared with the difference shown in FIG. 5A. The hook portions 10a, 10a of the spring 10 are farther spaced from each other and an area of the contact between the annular body portion 10b and the end face 9b of each wedge 9 is smaller than that shown in FIG. 5A.

An operation of the seat recliner of the present invention will be explained hereinafter.

When the camshaft 7 is rotated by operating the actuator in a clockwise or counterclockwise direction for adjustment of the seat back relative to the seat cushion, one of the end faces 8a, 8a of the cam portion 8 abuts against the side face of the positioning member 12 and the side face 9c of one of the two wedges 9, 9. The positioning member 12 and the wedge 9 then are forced to move in the direction of rotation of the camshaft 7. This causes displacement of the intermeshing between the external teeth 5b of the moveable bracket 5 and the internal teeth 3b of the fixed bracket 3. The intermeshing position thus progresses by one tooth at a time per rotation of the cam portion 8. This operation will be repeatedly carried out, so that the moveable bracket 5 can rotate with the camshaft 7 by a desired angle whereby the seat back can be placed in the desired reclining position.

During the adjusting operation of the reclining position of the seat back, the two wedges 9, 9 are held by the support 20 in the proper position on the cam portion 8 of the camshaft 7. As illustrated in FIG. 5A, the end face 9b of each wedge 9 is in contact with the support surface 22 of the support 20 at its inner circumferential portion and at the same time in contact with a portion of the annular body portion 10b of the spring 10 at its substantially outer circumferential portion. The opposite end face 9a of the wedge 9 is in contact with the end face of the positioning member 12. The displacement of the wedges 9, 9 in the axial direction of the camshaft 7 can be limited. The support 20 thus can enhance the retention of the wedges 9, 9 on the cam portion 8 of the camshaft 7.

Further, in this arrangement, the support 20 acts as a spacer for providing the predetermined space between the bushing 2 and the moveable bracket 5. The annular body portion 10b of the spring 10 can be placed in the predetermined space without being pressed against the wedges 9, 9. The wedges 9, 9, therefore, can be avoided from being adversely influenced by the spring and then can operate in reduction of the clearance or play between the internal teeth 3b and the external teeth 5b when the internal teeth 3b and the external teeth 5b are in the intermeshing position.

Furthermore, since the support 20 is formed integrally with the bushing 2, it is not required to additionally provide a retainer for the wedges 9, 9 as a separate component. Thus, the seat recliner of the present invention has a simple structure.

With the arrangement described above, the seat recliner of the present invention can perform with the simple structure a reliable adjustment of the reclining position of the seat back in which the clearance or play between the internal teeth and the external teeth of the brackets at the intermeshing position can be eliminated.

What is claimed is:

1. A seat recliner comprising:

a base;

a first bracket fixed to said base, said first bracket defining internal teeth;

a camshaft rotatably supported by said base and said first bracket, said camshaft having a first axis and a radially projecting cam portion;

a second bracket moveable relative to said first bracket, said second bracket being disposed between said base and said first bracket, said second bracket defining external teeth meshable with the internal teeth and an opening receiving said cam portion;

a positioning member cooperating with said cam portion to define a rotatable body fitted to the opening of said second bracket and bring a center axis of the rotatable body into a position eccentric to said first axis, said rotatable body causing displacement of intermeshing between the external teeth and the internal teeth upon rotation of said camshaft;

two wedges disposed on said cam portion within the opening of said second bracket, said two wedges being adjacent to said positioning member in an axial direction of said camshaft and spaced from each other in a circumferential direction of said camshaft;

a spring biasing said two wedges in opposed circumferential directions of said camshaft, said spring cooperating with said wedges to reduce a clearance between the external teeth and the internal teeth upon intermeshing;

a bushing fixed to said base, said bushing supporting said camshaft; and a support holding said two wedges in a proper position relative to said cam portion of said camshaft, said support being disposed on said bushing and extending in a direction of said axis.

2. A seat recliner as claimed in claim 1, wherein each of said two wedges includes opposed end faces spaced in the direction of said first axis and said support includes a support surface extending in a direction perpendicular to said first axis, said support surface being in contact with one of the opposed end faces of each wedge.

3. A seat recliner as claimed in claim 2, wherein said support includes a cylindrical integral flange formed integrally with said bushing and having the support surface of an annular shape.

4. A seat recliner as claimed in claim 3, wherein said support has an outer diameter greater than said cam portion of said camshaft and an inner diameter smaller than said cam portion of said camshaft.

5. A seat recliner as claimed in claim 4, wherein each of the opposed end faces of each wedge has a generally sectorial shape and the support surface of said support is in contact with an inner circumferential portion of said one of the opposed end faces of each wedge.

6. A seat recliner as claimed in claim 5, wherein said spring includes a generally annular body portion circumferentially extending around said camshaft and opposed hook portions connected with the annular body portion and extending substantially parallel to said first axis, said opposed hook portions being engaged with said two wedges.

7. A seat recliner as claimed in claim 6, wherein said support defines a space between said bushing and said second bracket that accommodates the annular body portion of said spring.

8. A seat recliner as claimed in claim 7, wherein the annular body portion of said spring includes a portion located near each of the opposed hook portions and contacted with an outer circumferential portion of said one of the opposed end faces of each wedge.

9. A seat recliner as claimed in claim 4, wherein said cam portion of said camshaft includes an axial end face and the support surface of said support is in contact with a part of the axial end face of said cam portion.

10. A seat recliner as claimed in claim 9, wherein said cam portion of said camshaft includes a first cam surface extending circumferentially and parallel to said first axis, on which said two wedges are moved upon rotation of said camshaft, and a second cam surface radially outwardly extending from the first cam surface and urging one of said two wedges upon rotation of said camshaft.

* * * * *